United States Patent [19]

Beardsley et al.

[11] Patent Number: 5,146,576
[45] Date of Patent: Sep. 8, 1992

[54] MANAGING HIGH SPEED SLOW ACCESS CHANNEL TO SLOW SPEED CYCLIC SYSTEM DATA TRANSFER

[75] Inventors: Brent C. Beardsley; Michael T. Benhase; Susan K. Candelaria, all of Tucson, Ariz.

[73] Assignee: International Business Machines Corporation, Armonk, N.Y.

[21] Appl. No.: 575,748

[22] Filed: Aug. 31, 1990

[51] Int. Cl.⁵ .................. G06F 13/00; G06F 13/12
[52] U.S. Cl. .................. 395/425; 395/725; 395/325; 364/DIG. 1
[58] Field of Search .................. 365/189.05

[56] References Cited

U.S. PATENT DOCUMENTS

| | | | |
|---|---|---|---|
| 4,393,445 | 7/1983 | Milligan et al. | 364/200 |
| 4,571,674 | 2/1986 | Hartung | 364/200 |
| 4,583,160 | 4/1986 | Iguma | 364/200 |
| 4,875,155 | 10/1989 | Iskiyan et al. | 364/200 |
| 4,882,642 | 11/1989 | Tayler et al. | 364/900 |
| 4,912,630 | 3/1990 | Cochcroft, Jr. | 364/200 |
| 4,947,319 | 8/1990 | Bozman | 364/200 |
| 4,956,803 | 9/1990 | Tayler et al. | 364/900 |

Primary Examiner—Alyssa H. Bowler
Attorney, Agent, or Firm—H. F. Somermeyer

[57] ABSTRACT

A cached DASD controller is illustrated which is attached to a high speed serial channel, such as an optical fiber channel. The data rate of the serial channel is much greater than the data rate of a DASD connected to the controller. The serial channel has a relatively long propagation time such that synchronous operations between the host processor 10 and the DASD cannot be efficiently performed. Operation of a data transfer, whether read or write between the host processor 10 and the DASD is monitored. Whenever reading a copy of the track contents stored in cache or the DASD reaches either an index mark, a break point from a roll mode operation or certain write operations occur resulting in predetermined data being stored in cache, then a GOCACHE flag is set in a control portion of the controller. The device operations are then momentarily idled while cache to host processor data transfer operations are enabled.

13 Claims, 3 Drawing Sheets

MANAGING HIGH SPEED SLOW ACCESS CHANNEL TO SLOW SPEED CYCLIC SYSTEM DATA TRANSFER

FIELD OF THE INVENTION

The present invention relates to data processing systems, more particularly to peripheral data processing systems. Such peripheral data processing systems preferably are of the cached data storage type.

BACKGROUND OF THE INVENTION

Direct Access Storage Devices (DASD) are a class of disk data storage devices currently used in data processing environments. Typically, the burst data rate between the DASD and its associated electronic circuits, such as a cache memory, varies from less than two megabytes per second through six or so megabytes per second. Because of such high burst rates and the electronic speeds of circuits attached to the DASD, it has been common practice to synchronize the operation of a host computer access to a DASD to the rotation disk being accessed. This mode of operation is called a synchronous mode, i.e., the operation of the data transfer is synchronized to the rotation of the disk in the DASD. Such synchronous operations are satisfactory up to a predetermined lengths of signal cables extending between the DASD and its controller and connecting host processors. The reason for the limitation in the spacing is propagation time of the signals between the host processor and the DASD controller. Such propagation time, if extended beyond a predetermined maximal elapsed time, requires a longer time to connect and reconnect to a host processor and exchange control signals then the DASD uses to scan a gap between a control field and a data field on the disk surface. If the propagation time exceeds the gap scanning time, then an additional rotation of the DASD disk is required for reading the data field after scanning a control field. That is, in CKD architecture (count, key, data) the count and key field always precedes the data field for each record. Except in a FORMAT WRITE operation, the count field is in a read mode while the data field can be either in the read or write mode. Using the CKD architecture, it is required to read the count field, scan a gap, and then read the data field. If the gap scanning time is less than the control signal propagation time, such synchronous operations are impossible. The above discussion does not describe all possibilities, the discussion is intended to explore a need for controlling and accessing DASD in other than a synchronous accessing mode.

With the advent of optical fiber channels having a data burst rate much greater than the data burst rate of the DASD, such as four times the burst rate. The data rate is combined with extra long cable length, such that a propagation delay is greater than the gap scanning time of the DASD, the rearrangement creates performance problems for a DASD peripheral subsystem. It is also desired to maximize utilization of the channel, i.e., maximize utilization of the optical fiber channel such that once a burst of data and its control signals are transferred over the channel, such transfer proceeds for as long as possible. Rate changing buffers can accommodate some of the burst rate differences; however, more control is needed for efficiently using a DASD with such a fiber optic channel that has long propagation delays. It is desired to operate the DASD and the channel in a non-sychronous mode such that operations with both the channel and the device can be optimized to a maximal extent for the data transfer being effected between the host processor.

DISCUSSION OF THE PRIOR ART

U.S. Pat. No. 4,912,630 shows batch or burst data transfers between slow and high speed systems. This patent teaches that data or signal bursts are limited by a elapsed time, i.e., a number of processor cycles. It is desired to avoid such an elapsed time limitation on bursts of data transfers.

U.S. Pat. No. 4,583,166 shows a cylindrical roll mode of DASD disk accessing and the use of a host channel type chain of commands within a peripheral subsystem. A so-called roll mode more efficiently uses a DASD in that data transfers can start at any rotational position of the disk. Such a roll mode is most effective for those data transfers involving one or more complete tracks of data to be transferred. The onset and termination of a data transfer beginning at any byte or record location on a track is called a break point. Such a break point is used as one logical criterion for controlling a peripheral subsystem in accordance with the present invention.

U.S. Pat. No. 4,214,742 shows an optical fiber serial channel to DASD connecting controller having a microprocessor. Several data paths, serial or parallel, are controlled by the microprocessor to effect different data transfers. The present application provides different data paths for different functions under microprocessor control, such as shown in this reference. In particular, a control of a rate-changing buffer and a cache are used in combination for maximizing data transfers between a DASD and the high data burst rate of a serial channel having long propagation time delays.

The present invention is also useful with the known extended count key data (ECKD) architecture used in International Business Machines Corporation data processing systems which are available from International Business Machines Corporation, Armonk, N.Y. Such ECKD architecture enables the transfer of a plurality of records within one read or write command. Count key data (CKD) format is still used on disks supplied by International Business Machines Corporation.

U.S. Pat. Nos. 4,393,445; 4,428,064 and 4,571,674 are cited for purposes of general interest and background in which the present invention is practiced. It is also noted that DASD can be either of the magnetic or optical type.

SUMMARY OF THE INVENTION

It is an object of the invention to provide an enhanced method and apparatus for transferring data between a cached DASD or other data processing subsystem and one or more host processors; using a high speed channel having a long propagation time.

According to the invention, a method of operating a cached peripheral controller which connects a high speed channel to a low speed device includes the steps of transferring data between a channel and the device via a controller, storing a copy of the data being transferred into a cache, monitoring the device operation for detecting that the data transfer has reached a predetermined status at the device; then terminating the data transfer from the channel, stopping the device activity as to the instant data transfer, and activating the cache and channel for transfers therebetween which do not involve the device. Such a decision is made independent of whether or not the data transfer between the host processor and device has been completed.

Apparatus using the present invention includes a peripheral subsystem having a plurality of peripheral devices, data transfer circuits connected to each of peripheral devices, a cache and a rate-changing data buffer being connected to the data transfer circuits for exchanging data signals therebetween, host attachment circuits connected to the buffer and said cache for exchanging data signals therewith and control means connected to the attachment circuits cache, buffer and data transfer circuits for controlling their respective operations including a GOCACHE flag which indicates that data transfers between one of the peripheral devices stops while data transfers between the cache and attachment means ensue. Control means monitor the operation of the device for determining the time to switch data transfer mode between device with attachment circuit operation to cache and attachment circuit data transfer operations.

The foregoing and other objects, features and advantages of the invention will be apparent from the following more particular description of preferred embodiments of the invention as illustrated in the accompanying drawings.

DETAILED DESCRIPTION AN ILLUSTRATIVE EMBODIMENT

Figure 1:
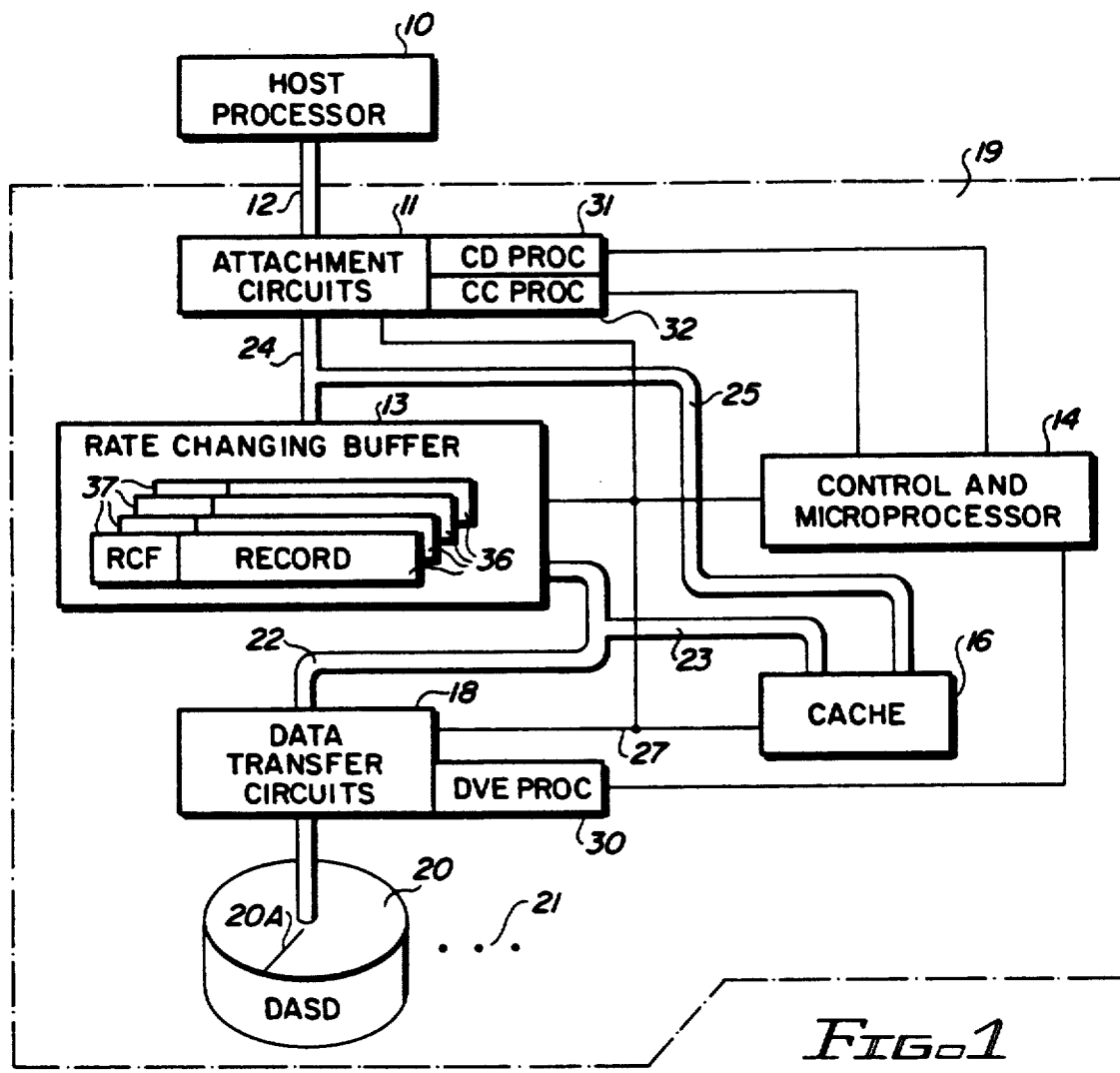
FIG. 1 is a simplified block diagram of a data processing system employing the present invention.

Referring now more particularly to the appended drawing, like numerals indicate like parts and structural features in the various diagrams. Host processor 10 is connected to peripheral subsystem 19 by a channel connection 12 (FIG. 1). Connection 12 between host processor 10 and the peripheral subsystem 19 is is a high speed optical fiber channel 12. Optical fiber channel 12 can have a relatively long signal propagation time, i.e., host processor 10 is physically displaced from the illustrated subsystem by a significant distance, such as set forth in the Background of the Invention. A plurality of host processors 10 can be connected to a single subsystem 19 and correspondingly a plurality of subsystems 19 can be connected to one or more host processors 10. Attachment circuits 11 contain the usual channel attachment circuits for a peripheral subsystem 19 for enabling communication between the host processor 10 and the peripheral subsystem 19. Included in a controller portion of the peripheral subsystem 19 is rate changing buffer 13 for accommodating differences in data burst rates of the optical fiber channel 12, DASD's 20, a control and microprocessor 14 (hereafter microprocessor) and a cache 16.

Each of said DASD's 20 preferably has a capacity of 100 or more megabytes, which stores or caches data for a more rapid access by host processor 10, as is well known. Data transfer circuits 18 are those electronic circuits used to modulate the signals to be recorded on DASD 20, demodulate signals received from DASD 20, provide error detection and correction operations on such data, add and delete control characters and fields, as is known for such DASD operations. Operation of data transfer circuits 18 is synchronous with the rotation of a disk in DASD 20 which is currently being accessed. Each peripheral subsystem 19 generally will contain a plurality of DASD's 20 as indicated by ellipsis 21. Each of the data storage disks (not separately shown) have an index or reference circumferential position 20A.

Data bus 24 contains control and data lines for enabling attachment circuits 11 to communicate with rate changing buffer 13 and has an extension 25 to cache 16 such that signals from host processor 10 can be received both from data buffer 13 or cache 16. During a write or recording operation, the data signals can be supplied only to cache 16 or only to rate-changing buffer 13. The bus 22 connects rate-changing buffer 13 to data-transfer circuits 18 with a side bus-connection 23 to cache 16 such that signals from rate-changing buffer 13 can be recorded on DASD 20 and simultaneously copied to cache 16. Data read from DASD 20 is supplied to either or both the rate changing buffer 13 and cache 16. Control line 27 represents a plurality of electrical connectors extending between control and microprocessor 14, hereafter microprocessor, and other major elements 11, 13, 16 and 18 of the controller for subsystem 19.

Figure 2:
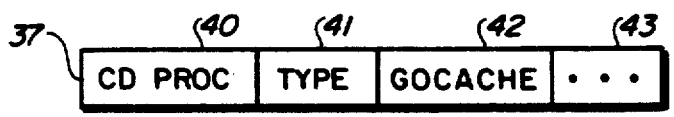
FIG. 2 is a simplified diagrammatic showing of a record control field used in the FIG. 1 illustrated system.

Microprocessor 14 includes a dispatcher or an executive which manages the operation of the microprocessor for controlling the peripheral data subsystem, as is known and practiced. Some of the microcode modules are used exclusively for providing specific functions involving the data transfers. These modules will be described enable an understanding the practice of the present invention. Microcode module DVE PROC 30 shown logically, as being next to data transfer circuits 18, actually resides physically in the microprocessor 14, is that portion of the controller microprocessor 14 for managing the data transfer circuits 18 and for effecting the data transfer operations between DASD 20, rate changing buffer 13 and cache 16. These types of operations are well known and not further described for that reason. Similarly, CD PROC 31 is that microcode module of used by microprocessor 14 for controlling the operation of attachment circuits 11. Such controlled operation transfers data signals between host processor 10 and rate changing buffer 13. Under DVE PROC 30 control, in a "branching" write operation, a copy of the data in rate changing buffer 13 is supplied to DASD 20 and is also supplied over bus extension 23 for storage in cache 16. Microcode module CC PROC 32 of microprocessor 14 controls data transfers between host processor 10 and cache 16 which do not involve rate changing buffer 13 nor DASD 20. Transfers of signals between host processor 10 and a cache 16 is well known and not detailed for this reason. With each record 36 stored in rate changing buffer 13 is a record control field RCF 37. Referring to FIG. 2, RCF 37 is shown as having a CD PROC portion field 40 for use during writing operations which is controlled by CD PROC 31 and read by DVE PROC 30. RCF 37 is initialized by CD PROC 31 on a write operation and initialized by DVE PROC 30 on a read operation. Upon a read operation, flag bytes (not shown) are set by DVE PROC 30 to inform CD PROC 31 the requirements for the record being transferred and the number of records remaining in the track to be read. Since the DVE PROC 30 and CD PROC 31 are known and not necessary to an understanding of the invention, these two modules are not further described. Setting GOCACHE during a DASD read operation can be for a host command read at either a breakpoint or track index or after a write domain has ended and a DASD 20 read mode is established. In some instances several writing operations may occur in one host processor 10 defined write domain. GOCACHE could be set at the end of a one of the several writing operations which is within the host processor 10 defined write domain. GOCACHE byte 42 is a flag set by DVE PROC 30 when a DASD 20 portion of a data processing operation is a DASD read operation and reaches a predetermined status such that operations with the DASD 20 are to be interrupted and ensuing operations are preferably conducted with cache 16. Such a direct connection between host 10 and cache 16 enables a maximum data transfer rate over the optical fiber channel 12 while the data transfers with DASD 20 may be more efficient from a control view but are slower, i.e., do not maximize the burst rate of optical fiber channel 12. The operations conducted at the DASD 20 data transfer rate, and are interrupted or segmented using the GOCACHE flag, as will become apparent. Field 41 indicates the type of record contained in the record image within rate changing buffer 13. This is used during read operations for enabling CD PROC 31 to know what type of record is being transferred of the CKD format. Four types of records are used in a constructed embodiment of the present invention. A first type of record is located at index or end of track, location. This first type of record in the illustrative embodiment is either a record zero, a home address record (the latter two are CKD control records) or a user record. Numeral 43 indicates that RCF 37 contains fields other than that shown in FIG. 2. The flow charts in FIGS. 4 et seq are directed toward operation of the illustrated FIG. 1 controller for a single device 20 which is currently transferring data with a host processor 10 via attachment circuits 11 and channel 12. It is to be understood that controller 19 simultaneously handles more than one device operation at a time. Therefore, a plurality of simultaneous device operations may occur, each of the device operations respectively relating to a different device 20.

Figure 3:
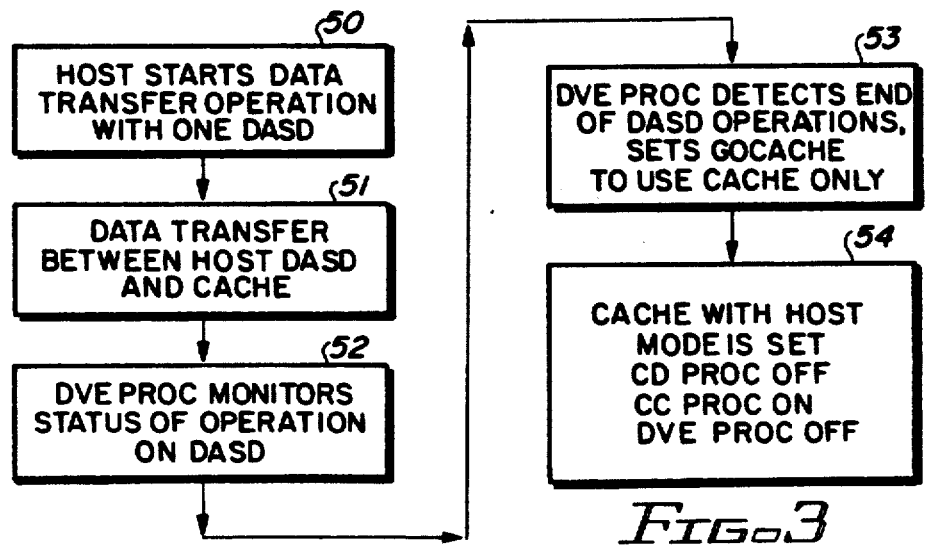
FIG. 3 is a simplified system machine operation flow chart showing the operations used in illustrating the present invention for the FIG. 1 illustrated system.

Referring next to FIG. 3, an overall view of machine operations of the FIG. 1 illustrated data processing system is shown. Host processor 10 starts a data transfer operation with an address to one DASD 20 at machine step 50. The data transfer actually occurs between the host processor and the data processing subsystem at machine step 51. This step includes transferring data between the DASD 20, the host processor 10 and between the DASD 20 and cache 16 upon a read operation and between host processor 10 and cache 16 on a write operation. In machine step 52, DVE PROC 30 monitors the status of the data transfer operation with respect to DASD 20. The purpose of this monitoring is to determine a status in which the mode of operations that switch from device oriented operation to cache oriented operation for more effectively using the high speed channel 12. At machine step 53, DVE PROC 30 detects a predetermined end of DASD operations and sets GOCACHE flag 42 for indicating to the rest of the controller a host cache operation is to ensue. Machine step 54 represents that the cache-to-host mode is set which is indicated by the CD PROC 31, DVE PROC 30 being inactive, and CC PROC 32 being established for effecting the data transfers. Activating CC PROC 32 before it is needed reduces channel response time between the controller and the host processor 10.

Figure 4:
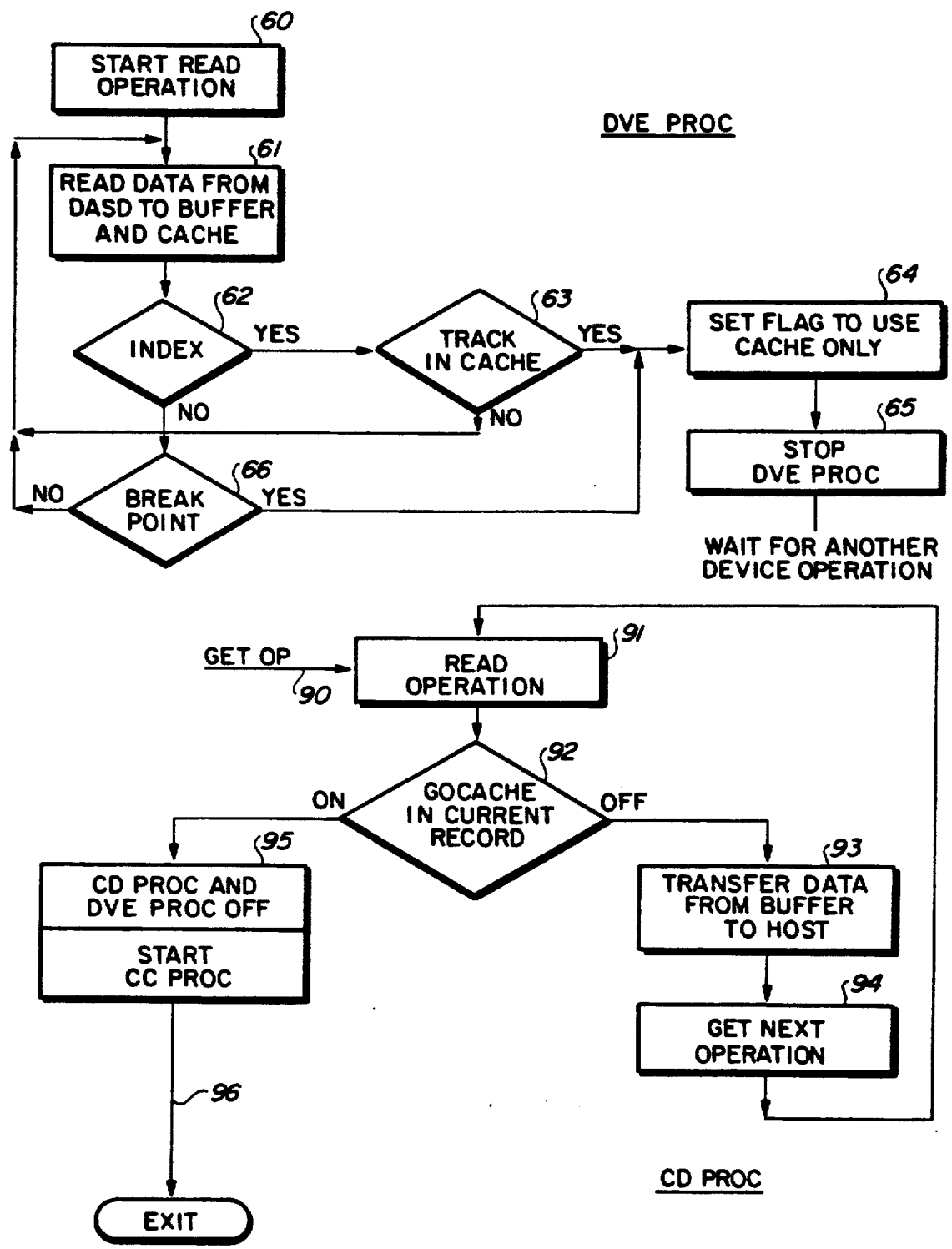
FIG. 4 is a simplified machine operations chart for a read operation showing another application of the present invention.

FIG. 4 shows a read operation which uses the present invention for controlling the data transfers. A read operation involves asynchronous operations controlled by CD PROC 31 for transferring data from buffer 13 to host processor 10 and by DVE PROC 30 for transferring data from DASD 20 to buffer 13 and cache 16. The DVE PROC 30 operations are first described. A host command read operation is initiated by host processor 10 at machine step 60, i.e., the controller 19 may have received a read operation command and is starting DVE PROC 30 to requested data from DASD 20 to buffer 13 and cache 16. Such reading is also initiated by controller 19 for desired records. The operation is described for a host requested read. This read operation can be for one or more records stored on DASD 20. At each DVE PROC 30 controlled machine step 61 iteration, the controller 19 reads one of the host requested data records from a DASD 20 to buffer 13 and cache 16 for supplying same via buffer 13 as controlled by CD PROC 31 to the host processor 10. At the end of each record, DVE PROC 30 determines whether or not an index mark 20A on the track of FIG. 1 has been sensed. If an index mark 20A is sensed, then the scanning of the disk is at an end of a track being addressed, also called a current track. At machine step 63, DVE PROC 30 determines whether or not the next track is stored entirely in cache 16. Note that the next track accessed by host processor 10 can be the current track or another track. If yes, then at machine step 64 the GOCACHE flag 42 is set to the active condition for signaling to CD PROC 31 to send a channel command retry to host processor 10 and to transfer control 10 CC PROC 32. Operation of a channel command retry (CCR) is well known and not further described for this reason. Following setting GOCACHE flag 42, DVE PROC 30 stops device operations as indicated at machine step 65 and waits for another device operation to begin. If the entire contents of the next track being read was not stored in cache 16 at machine step 63, then machine operations return to step 61. As described in the Background of the Invention, a break point can be the beginning and end of a roll mode track read operation for DASD 20 or the location of a first record of a split track stored in cache. If the break point has been read, then the contents of the current track being read is in cache and steps 64 and 65 are then performed. However, if no break point has been reached, then the read operation should continue by repeating steps 61, et seq. The operation of steps 64 and 65 stops the device operation based upon reaching an index mark and finding the contents of the current track and cache or reaching a break point during a read operation. If a next track is to be read and a copy of data stored in such next track is in cache 16, then the machine operations are then shifted from cache-to-host processor 10 operations for effecting higher data transfer rates enabled by the connection 12. It is to be understood that host processor 10 can terminate the FIG. 4 illustrated machine operations at any time, as is known.

The CD PROC 31 operations which occur asynchronously to the just-described DVE PROC 30 operations are next described. CD PROC 31 determines when a host processor 10 read command has resulted in records stored in buffer 13 are to be transferred over channel 12 to the host processor. The GET OP line 90 represents such determination. At machine step 91 a read operation of transferring data from buffer 13 to host processor 10. At machine step 92, CD PROC 31 checks the GOCACHE flag 42. If GOCACHE flag 42 is off, then data is to be transferred, i.e. such as one data record, from buffer 13 to host processor 13. This data transfer occurs at machine step 93. Following this data transfer, CD PROC 31 gets identification of the next operation to be performed, if the next operation is a host processor commanded read, then steps 91 et seq are repeated, otherwise operations beyond the scope of the present description are performed. If at step 91, the GOCACHE flag 42 is ON, then DVE PROC 30 has indicated that device operations should stop and cache operations should be initiated. At machine step 95, CD PROC 31 and DVE PROC 30 activities are stopped (note that reading of DASD 20 has already stopped and this action deactivates the DVE PROC module) and CC PROC 32 is activated for initiating cache 16 to host processor 10 data transfers. CD PROC is exited at 96.

Figure 5:
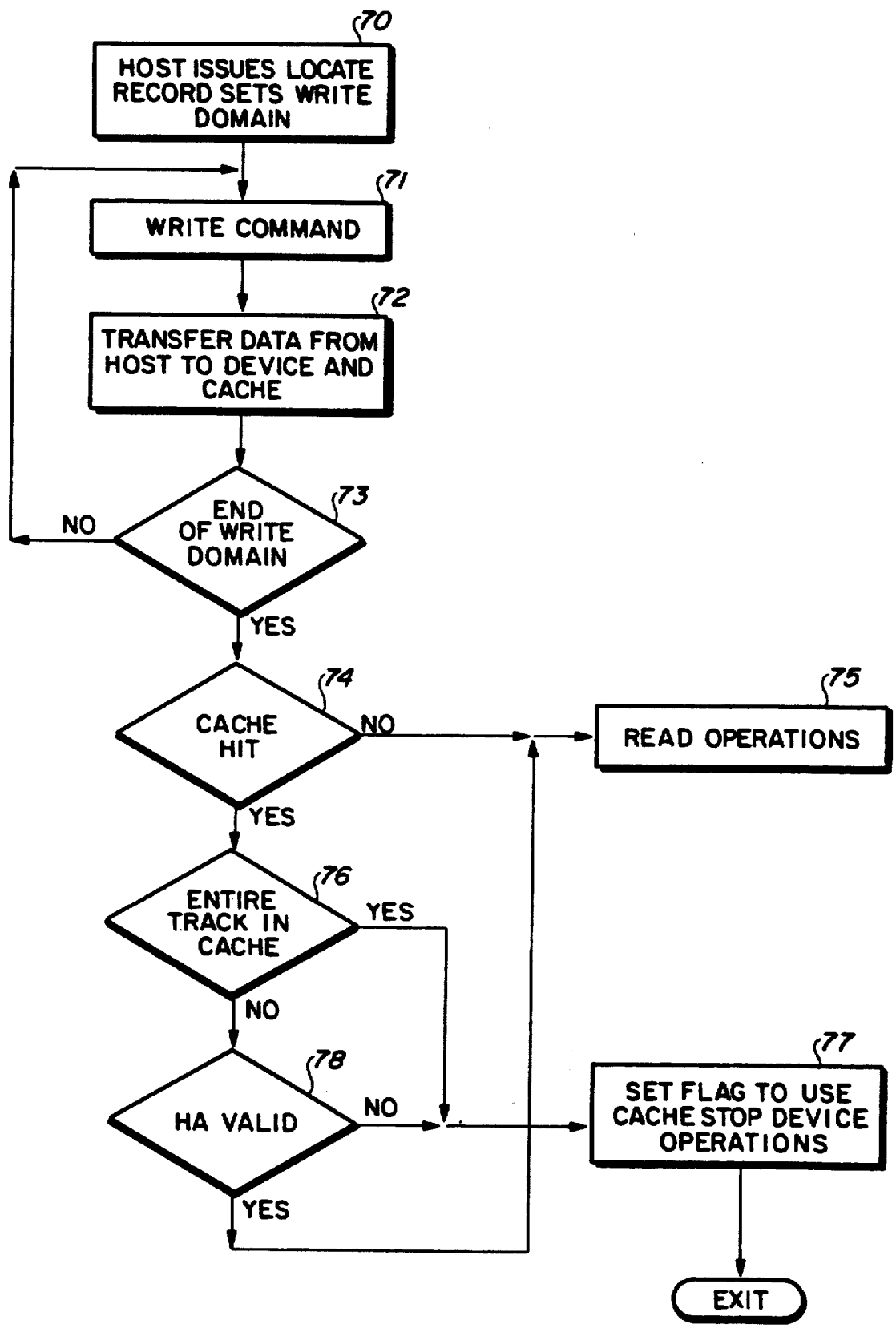
FIG. 5 is a simplified machine operations chart showing the sequence of operations for a recording or a write operation.

A write operation using the present invention is illustrated in FIG. 5. At machine step 70, host processor 10 issues a "LOCATE RECORD" command. This command is a known command which sets an address space or write domain of DASD 20 address space for limiting the write operation. A write command follows the LOCATE RECORD command at machine step 71. The data transfers indicated by the write command 71, which can be for more than one CKD record, is effected at machine step 72. At machine step 73, whether or not the end of the write domain has been reached is checked. If not, an additional write command can be received at step 71. This description assumes that the issued write commands are such that there is no overrun in rate changing buffer 13 and that cache 16 has sufficient data storage space for all of the data to be written to DASD 20. In the event of a possible overrun, a control mechanism beyond the description of the present invention can issue a channel command retry (CCR) which interrupts the transfer of data signals from host processor 10 to the illustrated data processing subsystem to prevent overrun or to recover from an overrun error. Such overrun prevention and recovery is not pertinent to an understanding of the present invention. If the end of the write domain has been reached, i.e., writing is completed, then at machine step 74 a check is made whether or not a cache hit was made, i.e., was there data in the cache relating to the write command, if not, device read mode operations are entered at step 75. If a cache hit has occurred, i.e., data was in the cache 16 that was overwritten by the write command, at machine step 72, then at machine step 76 whether or not a copy of the entire track is in cache 16 is checked. If yes, if an entire track has been written and it is in cache, then the GOCACHE flag is set at step 77. On the other hand, if the entire track is not in cache, then at machine step 78, whether or not the HA record is valid is checked, i.e., was index passed, and the home address record has been stored in cache 16. If yes then at machine step 78 device read mode operations of step 75 are entered.

While the invention has been particularly shown and described with reference to preferred embodiments thereof, it will be understood by those skilled in the art that various changes in form and details may be made therein without departing from the spirit and scope of the invention:

What is claimed is:

1. In a machine-effected method of operating a peripheral cached data storage subsystem, including the machine-executed steps of:

in a data signal transfer, transferring data signals between a connected host processor, a cache and a device in the peripheral cached data storage subsystem;

establishing a predetermined reference state of device operation that represents either scanning an index or a brake point of a current track being scanned;

monitoring the data signal transfer including monitoring operation of the device and the cache for indicating when the operation of the device has reached said predetermined reference state and the cache is storing a complete copy of a track of data signals that is being transferred in said data signal transfer, whether or not said data signal transfer has been completed;

detecting and indicating that the operation of the device has reached said predetermined reference state and that the cache is storing said complete copy of said data signals read from said current track being scanned; and in response to said indication, stopping further operations of the device irrespective of whether or not the data signal transfer is complete and actuating the peripheral cached data storage subsystem for initiating said transfer of data signals between the cache and the host processor without accessing the device during said initiated transfer of data signals between the cache and host processor.

2. In the machine-effected method set forth in claim 1 further including the machine-executed steps of:

establishing a write domain of data storage addresses in the device;

in said peripheral cached data storage subsystem, initiating a write operation wherein write data signals are transferred from the host processor to the established write domain in the device for recording and to the cache for storage;

detecting that the data storage address in the write domain for the write data signals has reached an extremity of the write domain, then examining the write data signals stored in the cache, if said examination of the write data signals stored in the cache including predetermined data signals, then performing the step of initiating said data signal transfer between the cache and host processor without accessing the device.

3. In the machine-effected method set forth in claim 2 wherein each said track of data signals includes a home address, further including the machine-executed steps of:

in said write operation, detecting if the home address of the current track is stored in the cache, if said home address is stored in the cache, establishing a read mode of operation in the subsystem, otherwise performing the step of initiating said data signal transfer between the cache and host processor without accessing the device.

4. In the machine-effected method set forth in claim 2 wherein each track of the device has said index for indicating an end of the track, said cache storing a break point indicating for each track of data signals stored in the cache an end of the stored track of data signals that does not correspond to data signals recorded in the device next to said index indicated end of a track, further including the machine-executed steps of:

- establishing a read operation in the subsystem wherein the data signals are transferred from the device to the host processor;
- in said monitoring step, monitoring for either said index or said break point; and
- during said monitoring, upon detecting either said index or said break point performing the initiating said data signal transfer between the cache and host processor without accessing the device.

5. In the machine-effected method set fourth in claim 4 further including the machine-executed steps of:

- reading data signals from the device in units of tracks of said data signals; and
- after detecting said index, detecting whether or not a next track of data signals that is to be read is currently stored in the cache; if such a track of data signals is stored in cache then performing the step of initiating said data signal transfer between the cache and host processor without accessing the device, otherwise continuing reading data signals from the device to the host processor.

6. In the machine-effected method set forth in claim 5 further including the machine-executed steps of:

- while reading data signals from the device to the host processor, storing a copy of the data signals in the cache.

7. In apparatus for a peripheral data processing system, including, in combination:

- a peripheral data processing device having a plurality of addressable data storage areas, each of said addressable data storage areas for storing one or more data records;
- a cache connected to the peripheral data processing device;
- a data buffer connected to the cache and to the peripheral data processing device;
- attachment means connected to the cache and to the data buffer;
- control means connected to the cache, data buffer, attachment means and to the peripheral data processing device;
- data transfer means for transferring data records between the attachment means, the cache and the peripheral data processing device, including accessing a predetermined one of said addressable data storage areas as a current track being scanned, an index or a break point in said current track being scanned;
- first means in the control means for monitoring the data record transfer and the operation of the device for detecting either said index or break point of said current track being scanned for indicating when the operation of the device has reached said predetermined reference state;
- second means for monitoring the cache and the peripheral data processing device for detecting that a complete copy of data stored in the current area of the device is stored in the cache; and
- said first means having third means responsive to said first means detecting that the operation of the peripheral data processing device has reached said predetermined reference state and to said second means detecting that a complete copy of data records stored in the current area is stored in the cache to indicate a gocache condition, fourth means connected to the third means for responding to the gocache indicating condition to stop further operations of the device irrespective of whether or not the data record transfer has been completed; said fourth means further responding to said gocache indicated condition for initiating operation of the cache with the host processor for transferring said data records between the cache and the host processor.

8. In the apparatus set forth in claim 7 further including, in combination:

- register means for storing control flags including a GOCACHE flag and being connected to said third means and said control means, said third means setting said GOCACHE flag to the active condition for storing said gocache indicated condition; and
- flag means in the control means for actuating the data transfer means for transferring data records between the cache and the attachment means and being connected to the register means for sensing the GOCACHE flag, said flag means being responsive to the GOCACHE flag being set to the active condition for actuating the data transfer means to transfer data records between the cache and the attachment means without accessing either said peripheral data processing device nor said data buffer.

9. In the apparatus set forth in claim 8 further including, in combination:

- the device have data storing addresses for accessing said addressable data storing areas;
- write means in the control means for establishing a write domain having a set of said data storing addresses of said device identifying a set of said data storing areas that are to receive and record write ones of the data records and for initiating a write operation wherein data records are transferred from the attachment means to the peripheral data processing device for recording in said set of data storing areas and to the cache for storage;
- mode means in the write means for detecting that the address of data records to be recorded in said set of data storing areas has reached an extremity of the write domain set of data storing address, said mode means examining the write ones of the data records stored in the cache for identifying predetermined ones of the write ones of the data records, said mode means responding to said identifying the predetermined ones of the write ones of the data records to set the GOCACHE flag to an active condition.

10. In the apparatus set forth in claim 9 further including, in combination:

- said peripheral data processing device being a DASD having a multiplicity of addressable data storage tracks, each track having a home address and said index at a beginning of each said track on the DASD;
- change means in the control means and connected to the write means and to the data buffer for sensing during the write operation of the write means if the home address of a track of data records having a data storage addresses in said write domain is stored in the cache, said change means responding to sensing that said home address is stored in the cache for changing operation of the subsystem from write to read.

11. In the apparatus set forth in claim 8 further including, in combination:

said peripheral data processing device being a DASD having a multiplicity of addressable data storage tracks that are said addressable data storage areas, each said addressable data storage track having a home address and said index signifying a beginning of each of the respective tracks;

roll mode means in said control means for indicating a break point at which reading of data records from any one of the addressable data storage tracks begins whether or not the reading began at the beginning of the any one of the addressable data storage tracks;

read means in the control means for establishing a read mode in the subsystem wherein the data records are transferred from the peripheral data processing device to the attachment means;

EOT means in the second means for detecting said index or said break point; and said EOT means being responsive to detecting either said index or said break point to set said GOCACHE flag in the register means to an active condition.

12. In the apparatus set forth in claim 11 further including, in combination:

said EOT means being further operative upon detecting said index to detect whether or not all data records recorded in a next to be accessed one of said addressable data storing tracks are stored in the cache, said EOT means responding to detecting that all of said data records of the next addressable data storing tracks are stored in the cache to set said GOCACHE flag to an active condition, otherwise continuing reading data records from said next to be accessed one of said addressable data storing tracks.

13. In apparatus for being connected to a host processor, including, in combination:

a cache and a rate-changing buffer;

a plurality of peripheral data storage devices, each of said device having a plurality of addressable data-storing portions, each of said addressable data-storing portions having a first type of record that indicates onset of a current data transfer between said cache and the respective device;

data transfer circuits connected to each of the peripheral devices;

said cache and said rate-changing data buffer being connected to the data transfer circuits for exchanging data signals therebetween;

host attachment circuits connected to said buffer and said cache for exchanging data signals therebetween;

control means connected to the attachment circuits, cache, buffer and data transfer circuit for controlling their respective operations and including a GOCACHE flag which indicates that data transfers between a one of the peripheral devices is to cease and data transfers between the cache and the attachment means may ensue; and CC processor means in the control means for effecting data transfers between the cache and the attachment means, DVE processor means in the control means for effecting data transfers between any one of the peripheral devices with said buffer, said DVE processor means having means for setting said GOCACHE flag for indicating a predetermined state of operation of the peripheral device that indicates accessing a predetermined access point of an addressable portion of the device that is being currently accessed for transferring data signals to said buffer and means for sensing the GOCACHE flag for activating the CC processor means to establish a data transfer mode between the cache and the attachment circuits.

* * * * *